US012706800B2

(12) United States Patent
Qu et al.

(10) Patent No.: US 12,706,800 B2
(45) Date of Patent: Aug. 11, 2026

(54) ETHERNET VIRTUAL PRIVATE NETWORK DEBUGGING USING INTENT GRAPH DATA

(71) Applicant: Juniper Networks, Inc., Sunnyvale, CA (US)

(72) Inventors: Diheng Qu, Palo Alto, CA (US); Chi Fung Michael Chan, Mountain View, CA (US); JP Senior, Calgary (CA)

(73) Assignee: Hewlett Packard Enterprise Development LP, Spring, TX (US)

(*) Notice: Subject to any disclaimer, the term of this patent is extended or adjusted under 35 U.S.C. 154(b) by 142 days.

(21) Appl. No.: 18/755,365

(22) Filed: Jun. 26, 2024

(65) Prior Publication Data

US 2026/0005920 A1 Jan. 1, 2026

(51) Int. Cl.
*H04L 41/0677* (2022.01)
*H04L 41/40* (2022.01)

(52) U.S. Cl.
CPC .......... *H04L 41/0677* (2013.01); *H04L 41/40* (2022.05)

(58) Field of Classification Search
CPC ... H04L 41/0677; H04L 41/40; H04L 41/065; H04L 41/0869; H04L 41/0663
See application file for complete search history.

(56) References Cited

U.S. PATENT DOCUMENTS 10,200,248 B1 2/2019 Jiang et al.
10,516,761 B1 12/2019 A et al.
10,992,543 B1 * 4/2021 Rachamadugu ...... H04L 41/145
11,086,709 B1 8/2021 Ratkovic et al.
11,283,691 B1 3/2022 A
2018/0367399 A1 12/2018 Pani et al.
2022/0294715 A1 * 9/2022 Agrawal ............. H04L 63/1408
2024/0022451 A1 * 1/2024 Dikshit ................... H04L 12/42
2024/0281360 A1 * 8/2024 Berg ..................... G06F 11/079
2024/0380670 A1 * 11/2024 Subramanian ........ H04L 41/145

OTHER PUBLICATIONS

Bjorklund, "Yang—a data modeling language for the network configuration protocol (NETCONF)", Internet Engineering Task Force, Oct. 2010, 173 pp.

(Continued)

*Primary Examiner* — Tonia L Dollinger
*Assistant Examiner* — Joseph M Cousins
(74) *Attorney, Agent, or Firm* — Shumaker & Sieffert P.A.

(57) ABSTRACT

A system includes a storage device configured to store intent graph data associated with a plurality of virtual networks and a plurality of network devices and processing circuitry in communication with the storage device. The intent graph data identifies a subset of the plurality of virtual networks associated with each network device. The processing circuitry is configured to determine whether the intent graph data indicates a first network device and a second network device are configured for a common virtual network, in response to determining that the graph indicates the first network device and the second network device are configured for the common virtual network, determine a network anomaly based on a comparison of first endpoint information obtained from the first network device and second endpoint information obtained from the second network device, and output an indication of the network anomaly.

19 Claims, 6 Drawing Sheets

(56) References Cited

OTHER PUBLICATIONS

Enns, "NETCONF Configuration Protocol", Network Working Group, Dec. 2006, 95 pp.

Harrington et al., "An Architecture for Describing Simple Network Management Protocol (SNMP) Management Frameworks", Network Working Group, Dec. 2002, 64 pp.

Extended Search Report from counterpart European Application No. 25166388.6 dated Oct. 1, 2025, 10 pp.

* cited by examiner

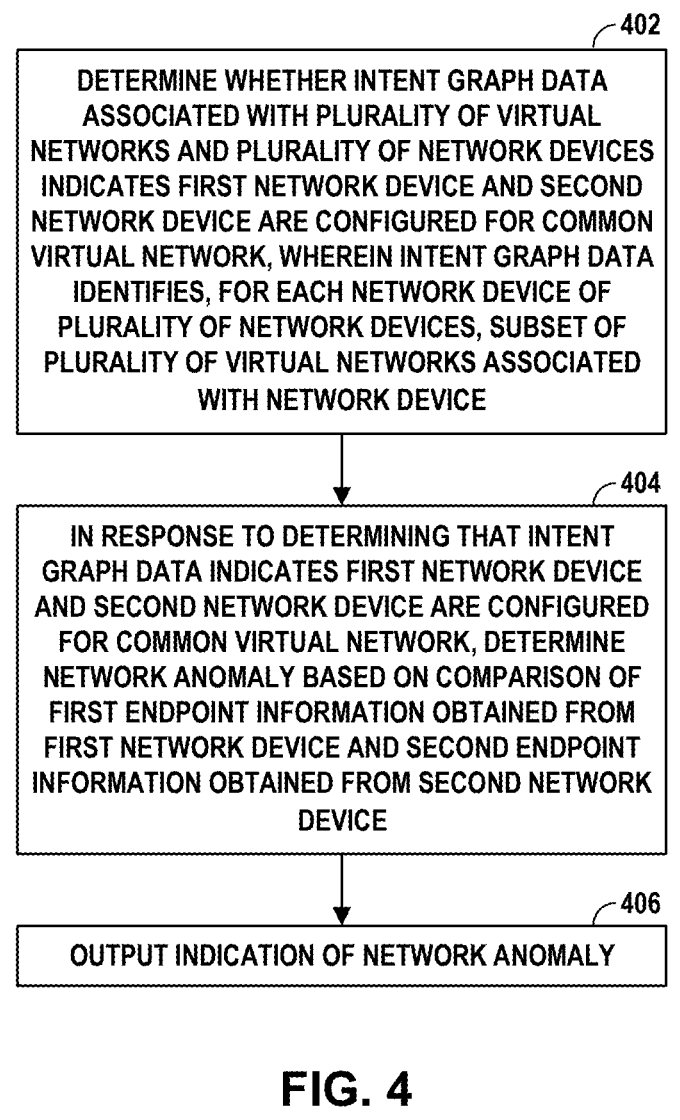

402
DETERMINE WHETHER INTENT GRAPH DATA ASSOCIATED WITH PLURALITY OF VIRTUAL NETWORKS AND PLURALITY OF NETWORK DEVICES INDICATES FIRST NETWORK DEVICE AND SECOND NETWORK DEVICE ARE CONFIGURED FOR COMMON VIRTUAL NETWORK, WHEREIN INTENT GRAPH DATA IDENTIFIES, FOR EACH NETWORK DEVICE OF PLURALITY OF NETWORK DEVICES, SUBSET OF PLURALITY OF VIRTUAL NETWORKS ASSOCIATED WITH NETWORK DEVICE

404
IN RESPONSE TO DETERMINING THAT INTENT GRAPH DATA INDICATES FIRST NETWORK DEVICE AND SECOND NETWORK DEVICE ARE CONFIGURED FOR COMMON VIRTUAL NETWORK, DETERMINE NETWORK ANOMALY BASED ON COMPARISON OF FIRST ENDPOINT INFORMATION OBTAINED FROM FIRST NETWORK DEVICE AND SECOND ENDPOINT INFORMATION OBTAINED FROM SECOND NETWORK DEVICE

406
OUTPUT INDICATION OF NETWORK ANOMALY

FIG. 4

ETHERNET VIRTUAL PRIVATE NETWORK DEBUGGING USING INTENT GRAPH DATA

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the client may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Ethernet Virtual Private Network (EVPN), virtual extensible local area network (VXLAN), Layer Three Virtual Private Network (L3VPN), Virtual Private Local Area Network Service (VPLS), and Peer to Peer (P2P) services. Other services include network configuration services, such as Dot1q Virtual Local Area Network (VLAN) Service. Network management systems (NMSs) and NMS devices, also referred to as controllers or controller devices, may support these services such that an administrator (e.g., a network administrator) can easily create and manage these high-level network configuration services.

SUMMARY

In general, this disclosure describes techniques for debugging Ethernet Virtual Private Network (EVPN) connection issues. An EVPN network (e.g., virtual extensible local area network (VXLAN)) may include network devices (e.g., leaf network devices such as virtual tunnel endpoints (VTEPs)) and end devices (e.g., client and server devices at the VTEPs). Traffic flow failures (e.g., forwarding failures or other network anomalies) between EVPN network devices can occur for various reasons. For example, network devices within a network (e.g., a VXLAN) may be misconfigured and/or have software (e.g., an application programming interface (API)) and/or hardware (e.g., application specific integrated circuit (ASIC)) bugs, which may cause traffic flow failures.

Some systems may rely upon diagnosis on a per network device basis, such as to check for consistency at the network device itself (e.g., configuration consistency and/or network information consistency between software/hardware within the device) independent from information from other devices including other network devices. Some network devices may be missing information, such as one or more medium access control (MAC) addresses of end devices, the absence of which does not indicate a network anomaly may exist or provide information that may be used to debug such an anomaly. For example, a network device may be missing one or more MAC addresses due to a misconfiguration or hardware/software bugs. In many environments, network devices may be provided by different vendors and have different EVPN implementations with distinct implementation nuances and/or bugs, which can result in traffic flow failures. As such, EVPN debugging can commonly require comprehensive knowledge across various vendor implementations, which may not be available even at a vendor's technical support level.

In accordance with the techniques of the disclosure, a network management system (NMS), also referred to herein simply as a "system," may identify network anomalies involving one or more network devices within a network using intent graph models (e.g., intent graph data). The NMS may utilize intent graph data to configure the network. In some examples, the NMS may collect endpoint information, such as, for example, MAC address tables, from network devices of a virtual network (e.g., an EVPN-VXLAN), populated as network devices generate network traffic on the virtual network. The NMS may compare the endpoint information for individual network devices based on the intent graph data. For example, the NMS may identify, based on the intent graph data, which network devices are on a particular virtual network. For instance, intent graph data may store a virtual network identifier (VNI) that assigns a given network device to a virtual network. As such, the NMS may query the intent graph data to identify which network devices share a particular virtual network (e.g., four network devices out of 200 network devices have a VNI of 10000).

The NMS may compare endpoint information from the identified network devices to determine a network anomaly at the particular virtual network. For example, the NMS may detect a network anomaly when endpoint information of one network device on a network (e.g., having a VNI of 10000) is missing information (e.g., missing a MAC address) that is present in endpoint information for another network device on the same network (e.g., also having a VNI of 10000). The NMS may perform automated diagnosis in response to detecting a network anomaly, including software-based diagnosis including high level diagnosis (e.g., route/switching table, border gateway protocol (BGP) information) and low level diagnosis (e.g., state table flag, ASIC debugging) of one or more network devices. For example, the NMS may perform automated diagnosis at network devices having endpoint information with missing information (e.g., anomalous network devices).

EVPN routing tables may identify a network device where a MAC address may be found (along with one or more assigned network paths or internet protocol (IP) addresses) and therefore may potentially be used to determine whether a network device's MAC address table is missing one or more entries. However, EVPN routing tables may be significantly larger than MAC address tables and thus collection and processing of EVPN routing tables consumes undesirable amounts of system resources. To illustrate, within each EVPN routing table, each MAC address may have multiple entries for each network path or IP address. In many EVPN environments (e.g., enterprise EVPNs), vast numbers (e.g., thousands, hundreds of thousands, etc.) of MAC addresses exist. As such, use of EVPN routing tables to discover anomalous network devices may not be scalable due to the size of EVPN routing tables, especially in enterprise/large network environments where EVPN debugging may have increased complexity.

As compared to using EVPN routing tables to identify network anomalies (e.g., anomalous network devices), using intent graph data to discover network anomalies, in accordance with the techniques of the disclosure, is significantly less resource intensive and therefore consumes fewer system resources in smaller networks and can scale to networks of varying sizes, including enterprise/large networks.

In one example, a system includes a storage device configured to store intent graph data associated with a plurality of virtual networks and a plurality of network devices, wherein the intent graph data identifies, for each network device of the plurality of network devices, a subset of the plurality of virtual networks associated with the network device, and processing circuitry in communication with the storage device, wherein the processing circuitry is configured to determine whether the intent graph data indicates a first network device and a second network device are configured for a common virtual network, in response to determining that the graph indicates the first network device and the second network device are configured for the common virtual network, determine a network anomaly based on a comparison of first endpoint information obtained from the first network device and second endpoint information obtained from the second network device, and output an indication of the network anomaly.

In another example, a method includes determining, by the processing circuitry, whether intent graph data associated with a plurality of virtual networks and a plurality of network devices indicates a first network device and a second network device are configured for a common virtual network, in response to determining that the graph indicates the first network device and the second network device are configured for the common virtual network, wherein the intent graph data identifies, for each network device of the plurality of network devices, a subset of the plurality of virtual networks associated with the network device, determining, by the processing circuitry, a network anomaly based on a comparison of first endpoint information obtained from the first network device and second endpoint information obtained from the second network device, and outputting, by the processing circuitry, an indication of the network anomaly.

In another example, non-transitory computer-readable storage media stores instructions that, when executed, cause processing circuitry to determine whether intent graph data associated with a plurality of virtual networks and a plurality of network devices indicates a first network device and a second network device are configured for a common virtual network, wherein the intent graph data identifies, for each network device of the plurality of network devices, a subset of the plurality of virtual networks associated with the network device, in response to determining that the graph indicates the first network device and the second network device are configured for the common virtual network, determine a network anomaly based on a comparison of first endpoint information obtained from the first network device and second endpoint information obtained from the second network device, and output an indication of the network anomaly.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a flowchart illustrating a first example process for network debugging, according to techniques of this disclosure.

DETAILED DESCRIPTION

Figure 1:
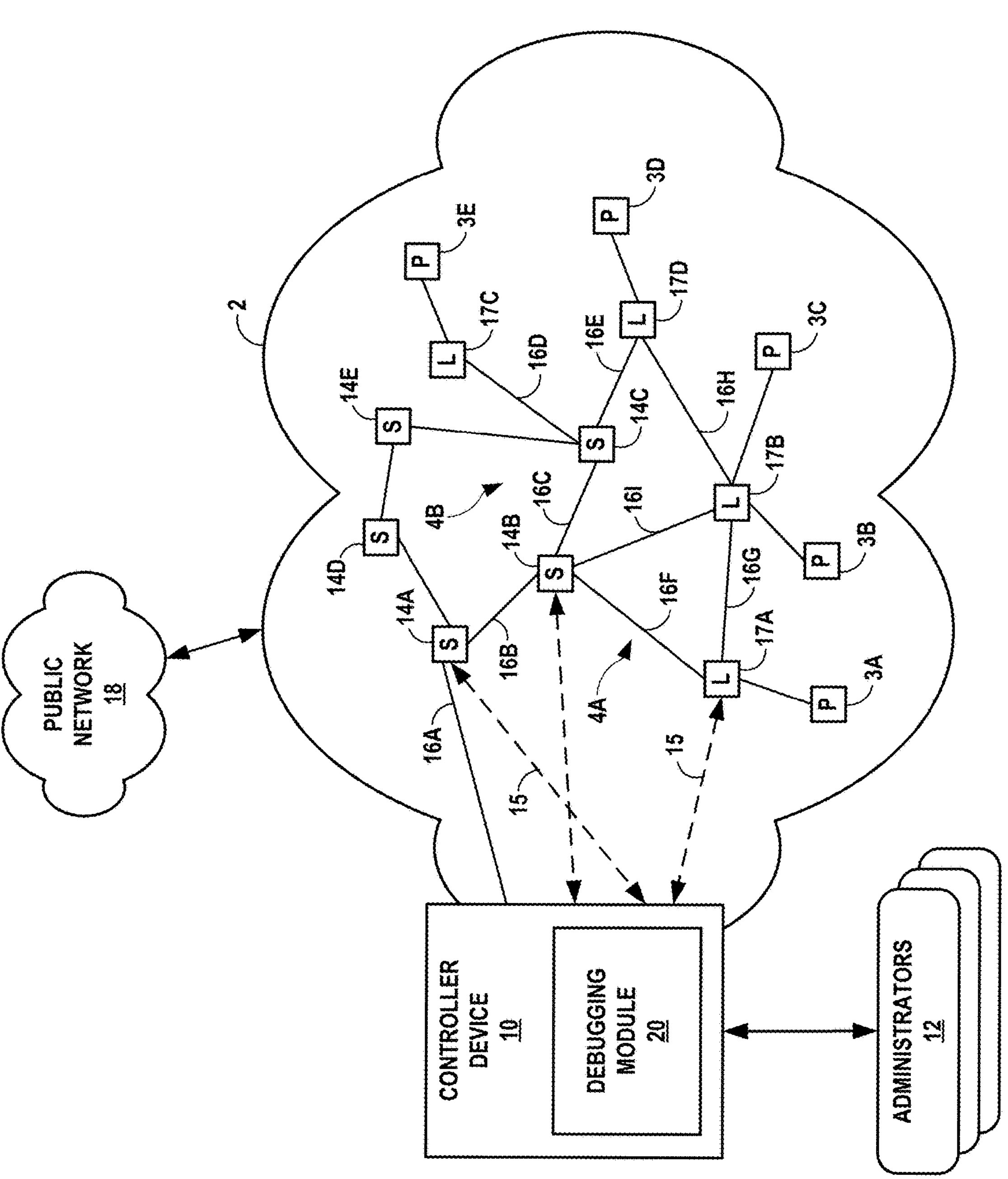
FIG. 1 is a block diagram illustrating an example including elements of an enterprise network that are managed using a controller device, according to techniques of this disclosure.

One form of datacenter is an Ethernet Virtual Private Network (EVPN) or an EVPN virtual extensible local area network (EVPN-VXLAN) data center in which Layer 2 (L2) connectivity is extended as a network overlay over the physical network fabric of the data center. The EVPN data center is a popular networking framework largely due to the limitations of traditional Virtual Local Area Network (VLAN) based networks. An EVPN may provide a form of L2 connectivity across an intermediate Layer 3 (L3) network to interconnect two or more L2 networks that may be located in different racks of data center. In this manner, an EVPN may be transparent to customer networks in that customer networks may not be aware of the underlying network and instead act and operate as if these customer networks were directly connected and form a single L2 network.

Network traffic from clients, servers, or other peer devices may be communicated via L2 or L3 EVPN using VLAN tags on the access layer and virtual network identifier (VNI) in the core between leaf network devices or between leaf network devices and spine network devices, often according to an overlay network set up via a control plane or routing protocol, such as BGP. In some examples, both leaf network devices and spine network devices may be network switching devices, with spine network devices aggregating traffic flows and/or providing high-speed connectivity between leaf network devices. Each leaf network device of a switch fabric may operate as a virtual tunnel endpoints (VTEP) for the overlay network of the switch fabric and encapsulate and decapsulate L2 packets. That is, each leaf network device of the switch fabric may perform L2 bridging for L2VLAN-tagged packets or performs both L2 bridging and L3 routing functions and tunnels those packets across the switch fabric of the data center.

To debug network anomalies (e.g., traffic flow failures) within an EVPN, some systems may rely upon on device consistency checking which may identify programming errors and hardware issues on an individual device basis. On device consistency checking may rely upon or require users (e.g., administrators) with extensive administrator knowledge to identify root causes of traffic flow failures. For example, a leaf network device on an EVPN may provide on device consistency checking limited to the leaf network device itself. Without a user possessing or having requisite knowledge to identify other potentially relevant network information external to the leaf network device, a root cause or information leading to a root cause of a network anomaly (e.g., forwarding failure) may not be discernable. For example, it may not be possible to determine medium access control (MAC) address(es) are missing at a particular leaf network device based on the on device consistency check alone. Moreover, numerous MAC addresses (e.g., hundreds, thousands, hundreds of thousands, etc.) within an EVPN may be created at various times and by various processes and services. As such, the requisite knowledge to diagnose a traffic flow failure may require repetitious and time consuming investigation and/or consistency checking at numerous individual leaf network devices.

The techniques described herein are directed to a system, such as for example a network management system (NMS), that identifies network anomalies within a virtual network (e.g., virtual extensible local area network (VXLAN)) using intent graph information (e.g., intent graph data) and endpoint information from various network devices (e.g., leaf network devices). Intent graph data may, for example, represent a plurality of virtual networks supported by an underlying network and associate leaf network devices to the virtual networks. For example, intent graph data may store a VNI that assigns a given leaf network device to one or more virtual networks.

The NMS may collect endpoint information, such as MAC address tables, from leaf network devices of a virtual network (e.g., a VXLAN) that may be populated as network traffic is generated on the virtual network. The leaf network devices may use their respective endpoint information (e.g., MAC address table) to route network traffic. The NMS may compare the collected MAC address tables based on the intent graph data to identify anomalous leaf network devices. For example, the NMS may query the intent graph data to determine a subset of leaf network devices are on a common virtual network (e.g., four leaf network devices out of 200 leaf network devices have a VNI of 10000). The NMS may compare the MAC address tables of each leaf network device within the common virtual network (e.g., leaf network devices with the VNI of 10000) to the MAC address tables of other leaf network devices on the common virtual network to identify network anomalies.

For example, the NMS may compare endpoint information from leaf network devices to identify one or more leaf network devices having endpoint information that is missing particular endpoint information (e.g., anomalous leaf network devices). For instance, anomalous leaf network devices may be leaf network devices with MAC address tables that lack MAC address(es) present in MAC address tables of other leaf network devices on the same virtual network. The NMS may identify a network anomaly (e.g., forwarding or traffic flow failure) when one or more leaf network devices have endpoint information (e.g., MAC address tables) with missing information.

Collection of endpoint information (e.g., MAC address tables) from numerous leaf network devices and determining anomalous leaf network devices based on intent graph data may be scalable at least because the size of endpoint information may only be a multiple of the number of network devices on a virtual network as compared to being an exponential amount, such as in with EVPN routing tables for example. As such, rather than waiting for users to report traffic flow failures, the described techniques for identifying anomalous leaf network devices may run repeatedly (e.g., periodically) without causing scalability issues (e.g., excessive network or compute resource consumption), such as in background processes, to discover, report, and diagnose anomalous leaf network devices.

FIG. 1 is a block diagram illustrating an example including elements of an enterprise network 2 (network 2) that are managed using a controller device 10. Managed elements 14A-14E (collectively, elements 14, nodes 14, or network devices 14) and elements 17A-17D (collectively, elements 17, nodes 17, or network devices 17) of enterprise network 2 include network devices interconnected via communication links 16, or edges 16, to form a communication topology in order to exchange resources and information. Elements 14, 17 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. In some examples, elements 14 and elements 17 may be different types of network devices. As will be described further below for instance, elements 14 may be spine network devices and elements 17 may be leaf network devices.

While aspects of the disclosure techniques may be described as transmitting, conveying, or otherwise supporting packets, enterprise network 2 may transmit data according to any discrete data unit defined by any protocol, such as, for example, Ethernet, a cell defined by the Asynchronous Transfer Mode (ATM) protocol, Transmission Control Protocol (TCP), or a datagram defined by the User Datagram Protocol (UDP). Communication links 16 interconnecting elements 14, 17 may be physical links (e.g., optical, copper, and the like), wireless, or any combination thereof.

Elements 14, 17 may each participate in an L2 virtual private network (L2VPN) service, such as an EVPN. The EVPN may be a service that provides a form of L2 connectivity across an underlying network (e.g., network 2), which may be an L3 network, to interconnect two or more L2 networks that may be networks for geographically or logically separated sites of an enterprise (or campus) or may represent networks for different customers of the intermediate network (e.g., tenants of network 2). The EVPN may be transparent to customer networks in that the customer networks are not aware of network 2 and instead act and operate as if the customer networks were directly connected to form a single L2 network. In a way, the EVPN enables a form of transparent local area network (LAN) connection between two customer networks that each operates an L2 network and may also be referred to as a "transparent LAN service."

In some examples, elements 14 may be spine network devices 14 and elements 17 may be leaf network devices 17 that participate in an EVPN. In the EVPN, traffic from peer devices 3A-3E (peer devices 3), such as client devices (e.g., mobile devices and laptop/desktop computers), server devices (e.g., physical or virtual servers), racks, switches, appliances, or other network devices, may be communicated via L2 or L3 EVPN using VLAN tags on the access layer and a VNI in the core between leaf network devices 17 or between leaf network devices 17 and spine network devices 14, often according to an overlay network set up via a control plane or routing protocol, such as BGP.

In some examples, both leaf network devices 17 and spine network devices 14 may be network switching devices (e.g., network switches), with spine network devices 14 aggregating traffic flows and/or providing high-speed connectivity between leaf network devices 17. In some examples, one or more spine network devices 14 may be "super" spine network devices that aggregate traffic flows and/or provide high-speed connectivity between spine network devices 17. In the example of FIG. 1 for instance, super spine network devices may be spine network devices 17D, 17E which connect spine network devices 14A, 14C. Each leaf network device 17 of a switch fabric may operate as a VTEP for the overlay network of the switch fabric and encapsulate and decapsulate L2 packets. That is, each leaf network device 17 of the switch fabric may perform L2 bridging for L2VLAN-tagged packets or perform both L2 bridging and L3 routing functions and tunnels those packets across the switch fabric of the data center.

In some examples, network 2 may deploy a L3 IP-based underlay network with one or more virtual networks 4A-4B (collectively, virtual networks 4 or VXLANs 4) (e.g., EVPN-VXLANs) as one or more overlay networks. For instance, virtual network 4 may constitute a logical L2 network created across a L3 underlay network 2. As shown in FIG. 1, network 2 may be an underlay network including one or more VXLANs 4 as overlay networks. For example, leaf network devices 17A, 17B, 17D and spine network devices 14B, 14C may constitute and participate in a first virtual network 4A with a VNI of 10000 and leaf network devices 17B, 17C, 17D and spine network devices 14B, 14C may constitute and participate in a second virtual network 4B with a VNI of 20000. Though shown with a particular number of network devices 14, 17, virtual network 4 may include one or more leaf network devices 17, one or more spine network devices 14, and one or more interconnecting communication links 16. For example, virtual network 4A may include communication links 16F, 16G, 16H, 16I and virtual network 4B may include communication links 16D, 16E, 16H. In some examples, leaf network device 17, spine network device 14, or both may be part of multiple virtual networks 4 (e.g., be assigned to multiple VXLAN VNIs).

In some examples, elements 14, 17 of network 2 may implement virtual networks 4 (e.g., VXLANs) to provide logical separation of the network traffic across shared links of network 2. Continuing the above example for instance, leaf network devices 17A, 17B, 17D may support peer devices 3A-3D (e.g., clients and/or servers) for a first group of users on VXLAN 4A with the VNI of 10000 and leaf network devices 17B, 17C, 17D may support peer devices 3B-3E for a second group of users on VXLAN 4B with the VNI of 20000. Traffic from the first group of users may be isolated from traffic from the second group of users even though such traffic may traverse one or more shared communication links 16 (e.g., communication link 16H) interconnecting leaf devices 17A-17D with each other or other network devices. In this manner, peer devices 3 on VXLAN 4 may communicate as if they were attached to the same wire.

Each VXLAN 4 may support a different set of peer devices 3. For example, VXLAN 4A may support a combination of one or more racks, servers, and switches and VXLAN 4B may support one or more servers.

Network 2 is shown coupled to public network 18 (e.g., the Internet) via a communication link 16. Public network 18 may include, for example, one or more client computing devices. Public network 18 may provide access to web servers, application servers, public databases, media servers, end-user devices, and other types of network resource devices and content.

Controller device 10 is communicatively coupled to elements 14, 17 via enterprise network 2. Controller device 10, in some examples, forms part of a device management system or "system", although only one device of the device management system is illustrated for purpose of example in FIG. 1. Controller device 10 may be coupled either directly or indirectly to the various elements 14, 17. Once elements 14, 17 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to herein as a network management system (NMS) or NMS device, and elements 14, 17 are centrally maintained by an IT group of the enterprise. Administrator 12 interacts with controller device 10 to remotely monitor and configure elements 14, 17. For example, administrator 12 may receive alerts from controller device 10 regarding any of elements 14, 17, view configuration data of elements 14, 17, modify the configurations data of elements 14, 17, add new network devices to enterprise network 2, remove existing network devices from enterprise network 2, or otherwise manipulate the enterprise network 2 and network devices therein. Although described with respect to an enterprise network 2 and virtual networks 4 thereof, the described techniques may be applied to other network types, public and private, including LANs, VLANs, VPNs, and the like.

Though described with respect to leaf network devices 17, the described techniques may be applied to various network devices, including spine network devices 14, peer devices 3, and other physical or virtual network devices (e.g., physical or virtual computing or other devices/processes connected to enterprise network 2 and/or virtual network 4). For example, controller device 10 may query intent graph data to identify various network devices assigned to a particular virtual network. Controller device 10 may collect endpoint information from these network devices. Controller device 10 may compare such endpoint information to identify anomalous network devices and network anomalies as described herein.

Controller device 10 may collect endpoint information from leaf network devices 17 of a virtual network 4 (e.g., a VXLAN) that may be populated as network traffic is generated on the virtual network. In some examples, leaf network device 17, in operation, may use the endpoint information (e.g., MAC address table) to route network traffic at leaf network device 17. Controller device 10 may compare the collected MAC address tables based on the intent graph data to identify anomalous leaf network devices 17. As will be described further below, controller device 10 may query the intent graph data to retrieve intent graph data that identifies a subset of leaf network devices 17 that are on a common virtual network 4 (e.g., four leaf network devices 17 out of 200 leaf network devices have a VNI of 5000). As such, controller device 10 may retrieve endpoint information from leaf network devices 17 on the common virtual network 4 based on the retrieved intent graph data. Controller device 10 may retrieve the endpoint information by sending a request (e.g., API call) to the leaf network devices 17 on virtual network 4. With respect to virtual network 4A of FIG. 1 for example, controller device 10 may retrieve a unit of endpoint information from each of leaf network devices 17A, 17B.

Controller device 10 may include a debugging module 20 which may compare the endpoint information (e.g., MAC address tables) of each leaf network device 17 within the common virtual network 4 (e.g., leaf network devices 17A, 17B, 17D on virtual network 4A with the VNI of 10000) to the endpoint information of other leaf network devices on the common virtual network to identify network anomalies. For example, debugging module 20 may compare endpoint information from leaf network devices 17 to identify one or more leaf network devices 17 having endpoint information that is missing information relative to the endpoint information of other leaf network devices 17. The identified leaf network devices 17 may be considered anomalous leaf network devices 17 because these leaf network devices 17 have endpoint information (e.g., MAC address tables) with missing information (e.g., lacking one or more MAC addresses). As such, anomalous leaf network devices may be leaf network devices 17 lacking MAC address(es) present in MAC address tables of other leaf network devices 17 on the same virtual network 4. Debugging module 20 may identify a network anomaly (e.g., forwarding or traffic flow failure) when one or more leaf network devices have endpoint information with missing information (e.g., when one or more anomalous network devices are detected).

In some examples, to determine a network anomaly, controller device 10 may compare endpoint information (e.g., MAC address tables) for leaf network devices 17 on a virtual network 4 to determine whether the endpoint information of the leaf network devices 17 is synchronized. For instance, controller device 10 may compare the MAC address table of a first leaf network device 17A to the MAC address table of a second leaf network device 17B. If each MAC address in a MAC address table of first leaf network device 17A is in a MAC address table of second leaf network device 17B, and vice versa, the endpoint information (e.g., MAC address tables) may be considered synchronized. For example, if the MAC address of first leaf network device 17A (e.g., AA) is in the MAC address table of second leaf network device 17B and the MAC address of second leaf network device 17B (e.g., BB) is in the MAC address table of first leaf network device 17A, controller device 10 may consider the endpoint information to be synchronized. If an entry (e.g., MAC address) is missing from endpoint information (e.g., MAC address table) of any leaf network device 17, controller device 10 may consider the endpoint information to be unsynchronized. Unsynchronized endpoint information (e.g., a MAC address table with missing or lacking particular MAC address(es)) is indicative of a network anomaly and may be used to identify a leaf network device 17 and/or its counterpart leaf network devices 17 on virtual network 4 as anomalous leaf network devices (e.g., root or other causes of a network anomaly).

Table 1 below illustrates an example of a unit of endpoint information in the form of a MAC address table for leaf network device 17A where each leaf network device 17A-17D is on virtual network with a VNI of 5000. The MAC addresses used herein are example MAC addresses that are truncated for brevity and explanation purposes.

TABLE 1

| Leaf Network Device | VLAN | VNI | MAC Address |
|---|---|---|---|
| 17A | 10 | 5000 | AA |
| 17B | 10 | 5000 | AB |
| 17C | 10 | 5000 | AC |
| 17D | 10 | 5000 | AD |

In the example of Table 1, endpoint information may include a VLAN identifier, VNI, and/or MAC address for one or more network devices, in some examples. In the example endpoint information of Table 1 for instance, leaf network devices 17A-17D are shown as being configured for a virtual network 4 with a VNI of 5000 and a VLAN identifier of 10. Debugging module 20 may retrieve endpoint information from leaf network devices 17 on virtual network 4. Referring to the example of Table 1 for instance, debugging module 20 may retrieve endpoint information from each leaf network device 17 on virtual network 4 with the VNI of 5000 (e.g., leaf network devices 17A-17D).

As described above, controller device 10 may collect endpoint information from various leaf network devices 17. Debugging module 20 may process (e.g., transform, consolidate, or combine) the collected endpoint information, such as for comparison purposes. The examples of Table 2 and Table 3 below illustrate example collected endpoint information for two example virtual networks 4, respectively, a first virtual network with VNI 10000 and a second virtual network with VNI 20000. In Table 2 and Table 3, the existence of presence of a particular portion or entry of endpoint information (e.g., a MAC address) within a unit of endpoint information is denoted by an "X" and the absence or lack of the particular endpoint information is denoted by a dash. In Table 2 and Table 3, each unit of endpoint information is shown in rows with the leftmost column identifying the leaf network device 17 from which controller device 10 collected (e.g., retrieved) the unit of endpoint information. Though shown with a particular number of leaf network devices 17, virtual network 4 may have fewer or additional leaf network devices 17 and, as such, fewer or additional units of endpoint information.

Debugging module 20 may determine whether leaf network device 17 is an anomalous leaf network device based on the collected endpoint information. For example, debugging module 20 may compare endpoint information for each leaf network device 17 to endpoint information for other leaf network devices 17 on virtual network 4, such as through set comparison.

TABLE 2

| Leaf | VNI: 10000 | | | |
|---|---|---|---|---|
| Network Device | MAC-1 (AA) | MAC-2 (AB) | MAC-3 (AD) | . . . |
| 17A | X | — | X | . . . |
| 17B | X | X | X | . . . |
| 17D | — | X | X | . . . |
| . . . | . . . | . . . | . . . | . . . |

Referring to Table 2 for example, controller device 10 may collect endpoint information from leaf network devices 17A, 17B, 17D on virtual network 4A with the VNI of 10000. Debugging module 20 may compare endpoint information collected from leaf network devices 17A, 17B, 17D.

For example, debugging module 20 may compare endpoint information from leaf network device 17A to endpoint information from leaf network device 17B. As shown in Table 2, the endpoint information from leaf network device 17B includes MAC-2 (AB) which the endpoint information from leaf network device 17A does not. Debugging module 20 may compare the endpoint information from leaf network device 17A to endpoint information from leaf network device 17D. As can be seen, the endpoint information from leaf network device 17A includes MAC-1 (AA) which the endpoint information from leaf network device 17D does not.

In some examples, debugging module 20 may compare each unit of endpoint information (e.g., endpoint information from a particular leaf network device 17) to every other unit of collected endpoint information for virtual network 4 to determining leaf network devices 17 with missing information (e.g., anomalous leaf network devices). Debugging module 20 may perform the comparison of endpoint information for multiple virtual networks 4.

TABLE 3

| Leaf | VNI: 20000 | | | |
|---|---|---|---|---|
| Network Device | MAC-1 (AB) | MAC-2 (AC) | MAC-3 (AD) | . . . |
| 17B | X | X | — | . . . |
| 17C | X | — | — | . . . |
| 17D | X | X | X | . . . |
| . . . | . . . | . . . | . . . | . . . |

Table 3 illustrates endpoint information collected by controller device 10 from virtual network 4B with the VNI of 20000 for example. Similar to above, debugging module 20 may compare endpoint information from leaf network device 17 on virtual network 4 to endpoint information from other leaf network devices 17 on virtual network 4 to identify endpoint information and leaf network devices 17 with missing information. Referring to Table 3 for example, debugging module 20 may compare endpoint information from leaf network device 17B to endpoint information from leaf network device 17C and determine that the endpoint information from leaf network device 17B includes MAC-2 (AC) while the endpoint information from leaf network device 17C does not. Debugging module 20 may compare endpoint information from leaf network device 17B to the endpoint information from leaf network device 17D and determine that the endpoint information from leaf network device 17D includes MAC-3 (AD) while the endpoint information from leaf network device 17B does not.

Based on the above comparisons, debugging module 20 may not be able to determine that the endpoint information for leaf network device 17C is missing an entry for MAC-3 (AD). As described above, debugging module 20 may compare each unit of endpoint information to every other unit of endpoint information. As such, debugging module 20 may compare the endpoint information from leaf network device 17C to the endpoint information of leaf network device 17B, as described above, as well as to the endpoint information of leaf network device 17D. Debugging module 20 may compare the endpoint information from leaf network device 17C to the endpoint information from leaf network device 17D and determine that the endpoint information from leaf network device 17D includes MAC-3 (AD) while the endpoint information from leaf network device 17C does not.

Debugging module 20 may identify anomalous leaf network devices based on the endpoint information with missing information. Referring to Table 2 for example, debugging module 20 may identify leaf network devices 17A, 17D as anomalous network devices because the endpoint information from leaf network devices 17A, 17D are respectively missing MAC-2 (AB) and MAC-1 (AA) on virtual network 4A with the VNI of 10000. With respect to the example of Table 3, debugging module 20 may identify leaf network devices 17B, 17C as anomalous network devices because the endpoint information from leaf network device 17B is missing MAC-2 (AC) and the endpoint information from leaf network device 17C is missing MAC-2 (AC) and MAC-3 (AD) on virtual network 4B with the VNI of 20000. Debugging module 20 may determine a network anomaly (e.g., forwarding or traffic flow failure) by the existence or identification of anomalous leaf network devices and/or determine the network anomaly exists at the anomalous leaf network devices.

Debugging module 20 may select the anomalous leaf network devices for further diagnosis. For example, debugging module 20 may perform automated diagnosis on the anomalous leaf network devices. In some examples, to perform automated diagnosis, debugging module 20 may execute software-based diagnosis including high level diagnosis (e.g., route/switching table, BGP information) and low level diagnosis (e.g., state table flag, ASIC debugging) of an anomalous leaf network device.

In some systems, during EVPN debugging, a network administrator may execute "show" commands to show, for example, switching or routing tables, or a BGP summary, at a leaf network device; however, this generally reveals high level configuration information that may not be sufficient to identify the root cause of a traffic flow failure. For example, high level configuration information may not be sufficient to identify software or hardware bugs or missing state flags.

In accordance with the techniques described herein, debugging module 20 may perform an automated diagnosis of the anomalous leaf network device including high level (e.g., switching or routing tables, or a BGP summary) and low level diagnosis (software or hardware bugs or missing state flags). In some examples, debugging module 20 may perform high level diagnosis by executing command line interface (CLI) commands, such as "show ethernet switching," show evpn database," or "show bgp summary" commands, or their equivalent at the anomalous leaf network device. Debugging module 20 may execute commands at the anomalous leaf network device, such as via a CLI interface or API provided by the anomalous leaf network device.

Debugging module 20 may input commands to the anomalous leaf network device through lower level CLIs or CLIs activated with various flags to run "show" commands for low level diagnosis. For example, certain "show" commands may be accessed via "cli-pfe" or "vty fpc0" or by setting debug flags such as "set debcm diag." Debugging module 20 may utilize vendor specific "show" commands, such as commands specific to JUNOS® or JUNOS-EVO™ from Juniper Networks, Inc., in some examples. Debugging module 20 may retrieve operating information by running CLI commands, such as "show" commands, and may analyze the operating information through a debugging process such as to identify missing flags/settings (e.g., misconfigurations) or software/hardware bugs.

To perform automated diagnosis debugging module 20 may execute one or more debugging processes. In some examples, one or more debugging processes may be respectively assigned to individual nodes of a decision tree data structure and be executed when the assigned nodes of the decision tree are traversed. Debugging module 20 may execute automated diagnosis by applying the decision tree (e.g., traversing the decision tree) to an anomalous leaf network device. As will be described below, the decision tree may include branches or subtrees common to elements 14, 17 from multiple vendors, from particular vendors, or both.

In some examples, administrator 12 uses controller device 10 or a local workstation to interact directly with elements 14, 17 (e.g., through telnet, secure shell (SSH), or other such communication sessions). That is, elements 14, 17 generally provide interfaces for direct interaction, such as CLIs, web-based interfaces, graphical user interfaces (GUIs), or the like, by which a user can interact with the devices to directly issue text-based commands. Examples of interfaces using text-based commands may include one or more of NX-API™, Arista EOS™, Juniper Telemetry Interface™, and gNMI telemetry collection interface. For example, these interfaces typically allow a user to interact directly with the device (e.g., through a telnet, secure shell (SSH), hypertext transfer protocol (HTTP), or other network session) to enter text in accordance with a defined syntax to submit commands to the managed element. In some examples, the user initiates an SSH session 15 with one of elements 14, 17, such as leaf network device 17A or spine network device 14A, using controller device 10, to directly configure element 14, 17 (e.g., leaf network device 17A or spine network device 14A). In this manner, a user can provide commands in a format for execution directly to elements 14, 17.

Further, administrator 12 can also create scripts that can be submitted by controller device 10 to any or all of elements 14, 17. For example, in addition to a CLI interface, elements 14, 17 may also provide interfaces for receiving scripts that specify the commands in accordance with a scripting language. In a sense, the scripts may be output by controller device 10 to automatically invoke corresponding remote procedure calls (RPCs) on the managed elements 14, 17. The scripts may conform to (e.g., extensible markup language (XML)) or another data description language.

Administrator 12 uses controller device 10 to configure elements 14 to specify certain operational characteristics that further the objectives of administrator 12. For example, administrator 12 may specify for an element 14, 17 a particular operational policy regarding security, device accessibility, traffic engineering, quality of service (QOS), network address translation (NAT), packet filtering, packet forwarding, rate limiting, or other policies. Controller device 10 uses one or more network management protocols designed for management of configuration data within managed network elements 14, 17, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741 December 2006, available at tools.ietf.org/html/rfc4741, the entire contents of which are incorporated herein by reference. Controller device 10 may establish NETCONF sessions with one or more of elements 14, 17.

A user "intent" may represent a single source of truth, from which device configurations are derived. An intent-based networking system may help to allow administrators to describe the intended network/compute/storage state. Intents may represent a state and may be persisted across system restarts so the user does not lose the source of truth for their network's management and operation. For example, suppose the intent starts with a network topology definition with servers connected to leaf switches, where the servers host user workloads. In this example, traffic between the servers could vary over time and/or hotspots could develop in the network. For instance, a workload could be deployed on two different racks of servers causing the traffic between the communicating processes to traverse an oversubscribed fabric. Telemetry may be used to detect the oversubscription and the workload distribution may then be updated so that endpoints get moved to the same rack, hence minimizing the use of oversubscribed links in the fabric. In this example, the intent could be modeling the policy of how widely distributed (e.g., how many racks) a workload's endpoint could be spread across, and/or how much fabric links are supposed to be used by this workload. In this way, the policy could be updated based on the current network state.

Intents may be represented as data models, such as intent graph data, which may be modeled using unified graphs. Intent graph data may include intent graph models represented as connected graphs, so that business policies can be implemented across intent graph models. For example, intent graph models may be represented using connected graphs having vertices connected with has-edges and reference (ref) edges. Controller device 10 may model intent graph models as unified graphs, so that the intent graph models can be represented as connected. In this manner, business policies can be implemented across intent graph models. When intents are modeled using a unified intent graph model, extending new intent support needs to extend the intent graph model and compilation logic.

Controller device 10 may be configured to accept high-level configuration data, or intents, from administrator 12 (which may be expressed as structured input parameters (e.g., according to YANG which is described in Bjorklund, "YANG-A Data Modeling Language for the Network Configuration Protocol (NETCONF)," Internet Engineering Task Force, RFC 620 October 2010, available at tools.ietf.org/html/rfc6020)).

In order to configure devices to perform the intents, a user (such as an administrator 12) may write translation programs that translate high-level configuration instructions (e.g., instructions according to an intent graph model, which may be expressed as a unified graph model) to low-level configuration instructions (e.g., instructions according to a device configuration model). As part of configuration service support, administrator 12 may provide the intent graph model and a mapping between the intent graph model to a device configuration model.

Controller device 10 may be configured to output respective sets of low-level device configuration data (e.g., device configuration additions, modifications, and removals). Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (e.g., produced by compiling or translating the intents) as "device-level intent configuration information" or "intent configuration," to distinguish this device-level configuration from out of band (OOB) device-level configuration. In some examples, controller device 10 may use YANG modeling for an intent graph model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent graph model. Controller device 10 may be configured to use the same compilation logic for each of create, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. Use of intents may case the management of networks and intents are declarative. To realize intents, controller device 10 may attempt to select optimal resources from elements 14, 17 and/or from other devices.

In general, controller device 10 may be configured to translate high-level configuration (e.g., intents received from an administrator for a plurality of managed network devices) to low-level configuration, which may also be referred to herein as "device-level configuration" (to be applied to the managed network devices themselves). In some instances, controller device 10 may receive an indication of a topology and a role for element 14, 17 and generate device-level configuration information for element 14, 17. For example, administrator 12 may select a topology and role for element 17A and provide an intent. In some examples, controller device 10 may generate device-level configuration for element 17A based on the role (e.g., leaf) of element 17A in the topology (e.g., a spine and leaf topology) and the intent. Similarly, controller device 10 may generate device-level configuration for element 14A based on the role (e.g., spine) of element 14A in the topology and the intent. As such, controller device 10 may generate indications of virtual networks 4 and elements 14, 17 that are configured for each respective virtual network 4 based on the intent. The indications of which elements 14, 17 are configured for which virtual networks 4 may be stored in the intent graph data (e.g., intent graph model). For example, controller device 10 may generate intent graph data identifying elements 14, 17 as being assigned to one or more virtual networks 4, such as by assigning a VNI or other identifier to elements 14, 17 in the intent graph data. In such manner, debugging module 20 may query the intent graph data to determine elements 14, 17 that are configured to be on each of one or more virtual networks 4.

Figure 2:
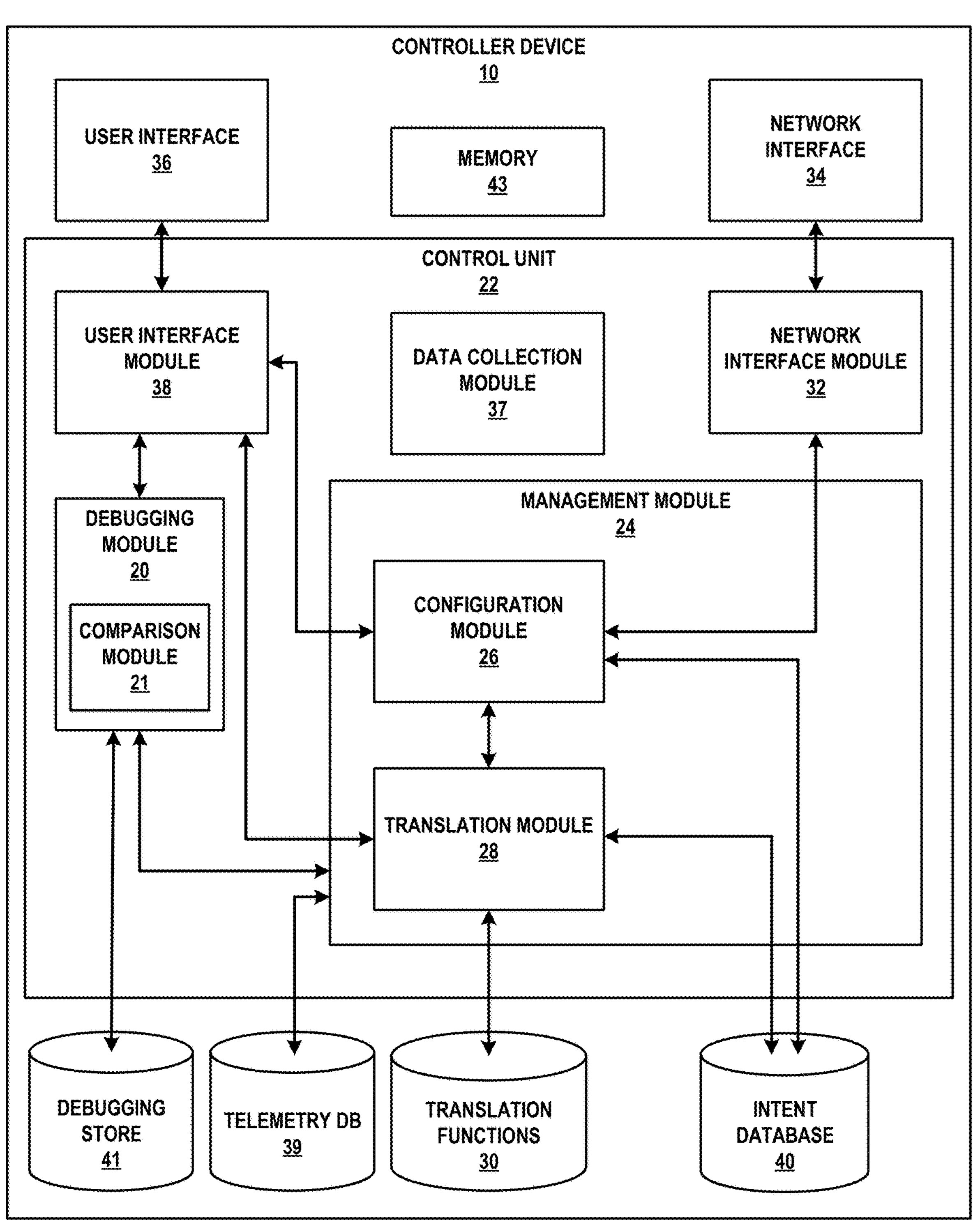
FIG. 2 is a block diagram illustrating an example set of components for the controller device of FIG. 1, according to techniques of this disclosure.

FIG. 2 is a block diagram illustrating an example set of components for controller device 10 of FIG. 1. In this example, controller device 10 includes control unit 22, network interface 34, user interface 36, and memory 43. Network interface 34 represents an example interface that can communicatively couple controller device 10 to an external device (e.g., one of elements 14 of FIG. 1). Network interface 34 may represent a wireless and/or wired interface (e.g., an Ethernet interface or a wireless radio configured to communicate according to a wireless standard, such as one or more of the IEEE 802.11 wireless networking protocols (such as 802.11 a/b/g/n or other such wireless protocols)). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10 (e.g., to provide input and receive output). For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely (e.g., via network interface 34).

In this example, control unit 22 includes user interface module 38, network interface module 32, management module 24, and revision module 20. Control unit 22 executes user interface module 38 to receive input from and/or provide output to user interface 36. For example, user interface module 38 may output one or more intent graph models generated by revision module 20 to user interface 36, such as for presentation (e.g., replay) to a user. User interface module 38 may output difference information for presentation as well.

User interface module 38 may receive input indicating a user request for an intent graph model via user interface 36. For example, user interface module 38 may receive a requested time from a user via user interface 36. Revision module 20 may retrieve a snapshot, difference information, or both for the requested time to generate the intent graph model for the requested time.

Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices (e.g., elements 14, 17 of FIG. 1). Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive an intent (e.g., a high-level configuration instruction) for a set of managed network devices from a user, such as administrator 12. In some examples, management module 24 may be referred to herein as a "fabric manager." Over time, the user may update the configuration instructions (e.g., to add new services, remove existing services, or modify existing services performed by the managed devices). The intents may be structured according to, e.g., YANG. In some examples, management module 24 also provides the user with the ability to submit translation functions that translation module 28 executes to transform intents to device-specific, low-level configuration instructions, as discussed below.

Memory 43 may include a computer-readable media used to store or cache snapshots of entire intent graph models and/or difference information. In some examples, memory 43 may be local to controller device 10, such as shown in the example of FIG. 2. In other examples, memory 43 may be local memory at a network administrator's computing device (e.g., a network administrator's local workstation).

Intent database 40 may store intent graph data (e.g., intent graph models). Intent database 40 may include a data structure describing a configuration of managed network devices (e.g., elements 14, 17). For example, intent database 40 may include information indicating device identifiers (e.g., MAC addresses, IP addresses), virtual network identifiers (e.g., VLAN identifiers, VNIs) device type, device vendor, devices species (e.g., router, switch, bridge, hub, etc.), or the like for elements 14, 17. Intent database 40 may store current configuration information (e.g., intent graph model, or in some cases, both intent graph model and low-level or device-level configuration information) for the managed devices (e.g., network elements 14). Intent database 40 may include a database that comprises a unified intent graph model. Intent database 40 may store at least the intent graph data of an intent graph model currently deployed at elements 14, 17 and zero or more (e.g., 5) intent graph models previously deployed at elements 14, 17.

Data collection module 37, which may comprise a writer and/or a reader, may be configured to receive telemetry data. For example, data collection module 37 may receive telemetry data from elements 14, 17, from a set of sensor devices associated therewith, or both. Telemetry database 39 may store telemetry data for network 2 and associate the telemetry data with a time. For example, controller device 10 may store a snapshot for a first time (T1) and may store only changes in event driven data between T1 and a third time (T3).

In some examples, controller device 10 may execute data collection module 37 to collect (e.g., retrieve) at least a portion of endpoint information from elements 14, 17 (e.g., leaf network devices 17). Data collection module 37 may send requests (e.g., API calls, CLI commands) to elements 14, 17 to retrieve endpoint information from elements 14, 17. Data collection module 37 may receive the requested endpoint information in response to the requests. Data collection module 37 may store at least a portion of the endpoint information in debugging store 41, such as in a data structure, database, or other structured data format. Data collection module 37 may assign one or more identifiers to endpoint information in debugging store 41. For example, data collection module 37 may store a unit of endpoint information from element 14, 17 along with an indication of element 14, 17 from which the unit of endpoint information was received, an indication of virtual network 4 to which element 14, 17 belongs (e.g., VNI), or both.

Data collection module 37 may collect endpoint information at various times. For example, data collection module 37 may periodically collect endpoint information from elements 14, 17, such as at a predefined intervals of time. Data collection module 37 may collect endpoint information from elements 14, 17 in response to user input or one or more events. For example, a user may initiate the EVPN debugging process for virtual network 4, such as via user interface 36 and/or user interface module 38 and data collection module 37 may collect endpoint information from elements 14, 17 in virtual network 4 as part of the EVPN debugging process.

Management module 24 may maintain a data structure in intent database 40. The data structure may include a plurality of vertices and a plurality of edges, each vertex of the plurality of vertices representing a respective network device of a plurality of network devices (e.g., network elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Translation module 28, which may also be referred to herein as a "device manager," may determine which devices are managed using intent database 40. Translation module 28 determines which of translation functions 30 to execute on the high-level configuration instructions based on the information of intent database 40 (e.g., which of the devices are to receive the low-level configuration instructions). Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example of allowing administrator 12 (FIG. 1) to interact with controller device 10, other user interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Control unit 22 executes debugging module 20 to identify network anomalies based on the intent graph data and endpoint information. Control unit 22 may execute debugging module 20 to query, from intent database 40, the intent graph data required for debugging purposes. For example, debugging module 20 may query the intent graph data from intent database 40 for virtual network 4, such as by the VNI for virtual network 4. For instance, debugging module 20 may query intent graph data from intent database 40 that identifies elements 14, 17 configured for virtual network 4 (e.g., configured to participate on virtual network 4 with the VNI of 10000). Intent database 40 may respond to the query by returning indications of elements 14, 17 that are configured for virtual network 4, such as elements 14, 17 with a VNI (e.g., 10000) matching a VNI of the virtual network 4 (e.g., 10000).

Debugging module 20 may receive the query response from intent database 40. Debugging module 20 may compare endpoint information from elements 14, 17 of virtual network 4 identified in the query response to identify anomalous network devices, such as described above. In some examples, debugging module 20 may include comparison module 21 that compares endpoint information from elements 14, 17 of virtual network 4 stored in debugging store 41 (e.g., previously collected endpoint information). Debugging module 20 may cause data collection module 37 to collect endpoint information, such as when the endpoint information is not available in debugging store 41 or when the endpoint information in debugging store 41 is beyond a threshold age (e.g., 2 hours) and therefore potentially not up to date. In some examples, debugging module 20 may automatically cause data collection module 37 to collect the endpoint information, regardless of any endpoint information in debugging store 41, such as to ensure the endpoint information is up to date.

Comparison module 21 may compare the endpoint information for elements 14, 17 within virtual network 4 to identify network anomalies. For example, comparison module 21 may compare each unit of endpoint information for elements 14, 17 within virtual network 4 to determine endpoint information with missing information (e.g., missing MAC address(es)). Comparison module 21 may identify any of elements 14, 17 with endpoint information including missing information as anomalous elements. Comparison module 21 may determine one or more network anomalies (e.g., forwarding or traffic flow failures) based on the existence of anomalous elements. For example, comparison module 21 may identify a network anomaly at network segments supported by the anomalous elements.

Debugging module 20 may perform an automated diagnosis of the anomalous elements including high level (e.g., switching or routing tables, or a BGP summary) and low level diagnosis (software or hardware bugs or missing state flags). In some examples, debugging module 20 may perform high level diagnosis by executing CLI commands, such as "show ethernet switching," show evpn database," or "show bgp summary" commands, or their equivalent at the anomalous leaf network device. Debugging module 20 may execute commands at the anomalous leaf network device via a CLI interface provided by the anomalous leaf network device.

Debugging module 20 may input commands to the anomalous leaf network device through lower level CLIs or CLIs activated with various flags to run "show" commands for low level diagnosis. For example, certain "show" commands may be accessed via "cli-pfe" or "vty fpc0" or by setting debug flags such as "set debcm diag." Debugging module 20 may utilize vendor specific "show" commands, such as the "JUNOS-EVO only" commands, in some examples. Debugging module 20 may retrieve operating information by running CLI commands, such as "show" commands, and may analyze the operating information through a debugging process such as to identify missing flags/settings (e.g., misconfigurations) or software/hardware bugs.

To perform automated diagnosis debugging module 20 may execute one or more debugging processes in sequence. In some examples, one or more debugging processes may be respectively assigned to individual nodes of a decision tree data structure and be executed when the assigned nodes of the decision tree are traversed. Debugging module 20 may execute automated diagnosis by applying the decision tree (e.g., traversing the decision tree) to an anomalous element. The decision tree may include branches or subtrees common to elements 14, 17 from multiple vendors, from particular vendors, or both. Debugging module 20 may store the decision tree in debugging store 41, such as in a data structure, database, or other structured data format.

In some examples, various portions or modules of controller device 10 may be distributed between multiple controller device 10 or other devices (e.g., physical or virtual servers, appliances, network devices). For instance, debugging module 20 may reside (e.g., be stored on) and execute on one or more of peer devices 3, such as a server or appliance, or network devices 14, 17. In such case, controller device 10 may collect endpoint information, such as through data collection module 37. Peer device 3, one or more of network devices 14, 17 and/or another device upon which debugging module 20 resides may perform network debugging by executing debugging module 20.

Figure 3:
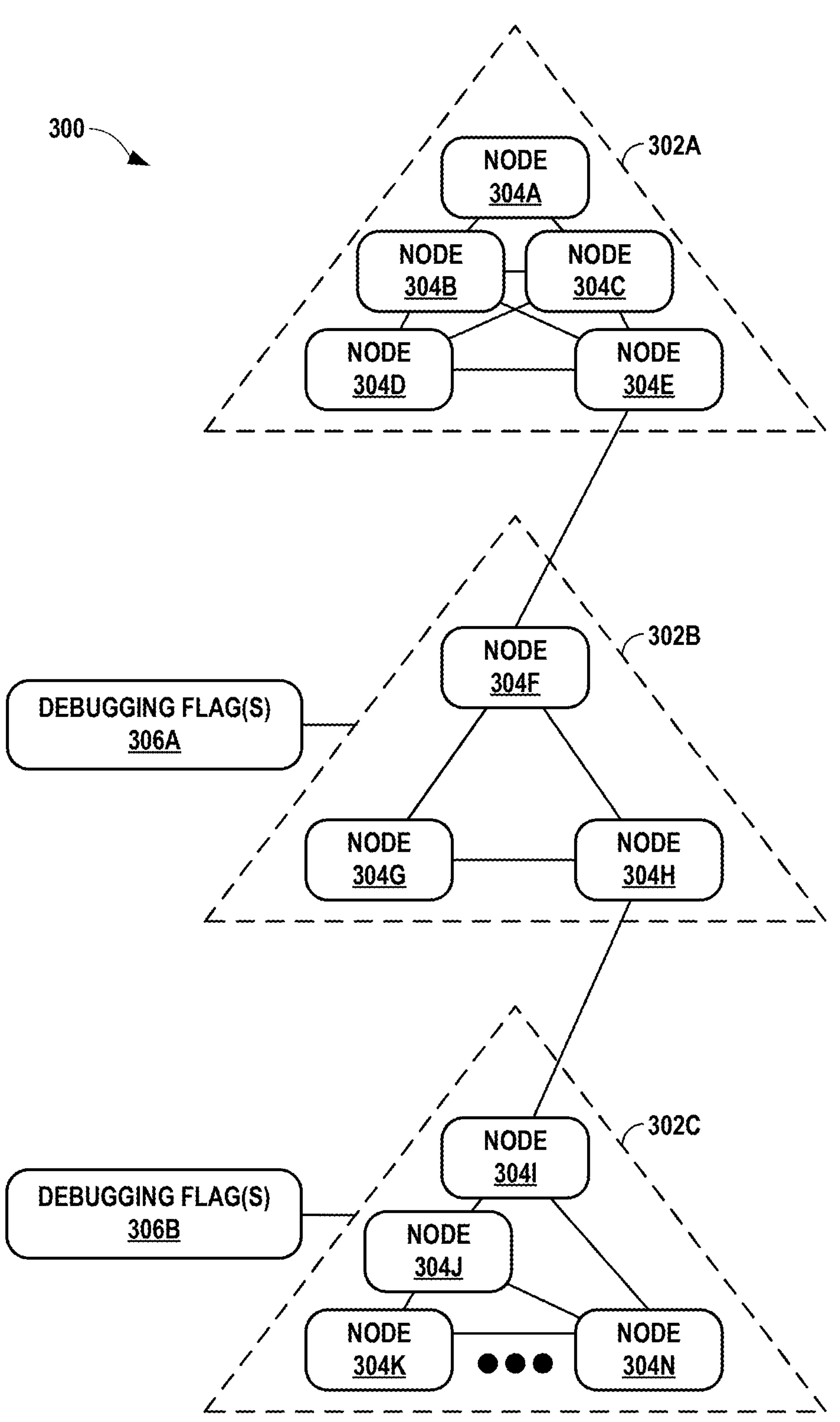
FIG. 3 is a block diagram illustrating an example decision tree for performing automated network device diagnosis, according to techniques of this disclosure.

FIG. 3 is a block diagram illustrating an example decision tree 300 for performing automated network device diagnosis, according to techniques of this disclosure. In the example of FIG. 3, decision tree 300 may represent a diagnostic process that may be performed by, for example, controller device 10, or more particularly, for instance, debugging module 20, one or more of network devices 14, 17, or another device (e.g., a server or virtual machine connected to network 2 using network devices 14, 17). For instance, controller device 10 and/or network devices 14, 17 may perform, in response to detecting an anomaly, an automated network device diagnosis that traverses decision tree 300. Decision tree 300 may include one or more subtrees 302A-302C (collectively, subtrees 302) and one or more nodes 304A-304N (collectively, nodes 304). Subtrees 302 may represent one or more diagnosis levels and nodes 304 may represent one or more debugging processes. Debugging module 20 may assign one or more debugging processes to nodes 304 by storing an indication of one or more debugging processes assigned to node 304A along with node 304A in debugging store 41. In some examples, a debugging process may include one or more commands (e.g., CLI commands or API requests) that, when executed at elements 14, 17, cause elements 14, 17 to output operating information (e.g., configuration information, settings, device information, device metrics, vendor information).

In operation, debugging module 20 may traverse to node 304A of decision tree 300 and execute the debugging process(es) assigned to node 304A at element 14, 17 (e.g., an anomalous element). In response, element 14, 17 may output operating information to debugging module 20 and debugging module 20 may use the operating information to diagnose element 14, 17. For example, debugging module 20 may determine network device anomalies, such as missing settings/flags (e.g., misconfigurations) and/or hardware or software bugs indicated by the operating information. For instance, debugging module 20 may identify, as a network device anomaly, a flag or setting is missing in the operating information or that element 14, 17 includes a version of hardware, software, or firmware that has one or more bugs from the operating information and output an indication of the network device anomaly (e.g., missing flag/setting or hardware/software/firmware bug) for element 14, 17. Debugging module 20 may output debugging information, including any network device anomalies, operating information, or both, and/or may store the debugging information, such as in debugging store 41.

Subtrees 302 may, in some examples, include nodes 304 pertaining to a particular diagnosis level. As shown in the example of FIG. 3 for instance, a first subtree 302A may include nodes 304 with debugging processes that, when executed, perform a first level diagnosis (e.g., high level diagnosis), a second subtree 302B may include nodes 304 with debugging processes that perform a second level diagnosis (e.g., intermediate level diagnosis), and a third subtree 302 may include nodes 304 with debugging processes that perform a third level diagnosis (e.g., low level diagnosis). Nodes 304 may store the commands, debugging flags 306 (e.g., CLI flags), or both required to execute their respective debugging processes, including vendor specific commands and debugging flags 306.

For example, first subtree 302A may include nodes 304 with debugging processes that include standard CLI commands, which may be available at elements 14, 17 without requiring debugging flags 306 to be enabled. Some examples of standard CLI commands include MAC address table commands such as, "show ethernet switching mac-ip table [extensive]," "show ethernet switching table," "show ethernet-switching vxlan-tunnel-end-point [remote-|source|esi|mh-peers]," and "show ethernet-switching context-history [mac|mac-ip|mac-addr]" or EVPN database commands such as, "show evpn database [extensive]," "show evpn instance evpn-1 [extensive]," and "show evpn database mac-address <mac> [extensive] or BGP route table commands such as, "show bgp summary" and "show route table bgp.evpn.0" or route table commands such as "show route table: vxlan.inet.0."

Some debugging processes of nodes 304 may require debugging flags 306 (e.g., CLI flags) to be set or initialized before the debugging processes may be executed at element 14, 17. For example, second subtree 302B may include nodes 304 with debugging processes that include CLI commands that require one or more second debugging flags 306A to be enabled (e.g., software CLI flags). For example, debugging flags 306 may include, "cli-pfe" or "vty fpc0" CLI flags. Some example CLI commands that may require debugging flags 306A include L2 commands such as, "show l2 manager mac-table," "show l2 manager bridge-domains [detail]," "show l2 manager routing-instance [detail]," "show l2 manager sw-to-hw-diff," "show l2 manager ctx-history mac-address <mac>," and "show l2 manager mac-context <mac>." Some example, vendor specific L2 commands that may require debugging flags 306A include JUNOS only commands such as, "show l2 manager mac-ip" and "show l2 manager mac-ip (ipv4|ipv6)." Other example CLI commands that may require debugging flags 306A include JUNOS only commands such as, "show shim bridge gl2d-to-bd," show ship virtual bridge-domain," "show shim bridge interface," "show shim virtual vport," and "show shim route" or JUNOS-EVO only commands such as, "show evo-pfemand layer 2 bd-table," "show evo-pfemand layer2 mac-fdb-table," "show evo-pfemand virtual bridge-domain," and "show evo-pfemand virtual vtep."

In some examples, decision tree 300 may include subtrees 302 (e.g., branches) common to elements 14, 17 from multiple vendors, from particular vendors, or both. For instance, subtree 302B may exclusively include nodes 304 that utilize JUNOS or JUNOS-EVO only commands, or may include nodes 304 that utilize JUNOS, JUNOS-EVO, and vendor-agnostic or other vendor-specific commands. Debugging module 20 may initialize or set any required debugging flags 306 at elements 14, 17 prior to executing CLI commands of debugging processes that may require debugging flags 306.

Third subtree 302C may include nodes 304 with debugging processes that include CLI commands requiring one or more third debugging flags 306B to be enabled. Debugging flags 306 may differ between subtrees 302 of decision tree 300. As such debugging flags 306A of subtree 302B may be different than debugging flags 306B of subtree 302C. For example, third debugging flags 306B may include hardware CLI flags, such as "set debcm diag" from pfe-cli or "jbcmsh" on a bash shell. Some example CLI commands that may require debugging flags 306B include, "l2 show," "dump chg vfi," "dump chg l3_iif_profile," "l3 l3table show," "l3 defip show," "l3 ecmp show," "l3 egress show," "l3 ip6route show," "l3 route show," "l3 trunk show," "stg show," "vlan show," and "vlan action translate show."

In some examples, debugging module 20 may traverse decision tree 300 based on the debugging information (e.g., operating information, network device anomalies). As shown in FIG. 3 for example, debugging module 20 may traverse between nodes 304 of one or more subtrees 302 of decision tree 300 based on the debugging information. For example, nodes 304 may include conditional steps that, when executed, cause debugging module 20 to traverse to another node 304 in the same or different subtree 302. A conditional step may identify a first node 304A or a second node 304B (or an $n^{th}$ node 304N) as the next node 304 for debugging module 302 to traverse to based on the debugging information. For example, node 304A of subtree 302A may include a conditional step that directs debugging module 20 to traverse to node 304C of subtree 302A, such as when operating information includes a missing flag or setting. A conditional step of node 302 may direct debugging module 20 to traverse to node 304 of the same or another subtree 302. For example, subtree 302B may include nodes 304 with debugging processes that require particular vendor specific debugging flags 306. As such, node 304B of subtree 302A may include a conditional step that directs debugging module 20 to traverse to node 304F of subtree 302B, such as when the currently available operating information (e.g., vendor identification) indicates vendor specific CLI commands requiring debugging flags 306 may be required to obtain relevant operating information.

As can be seen, one or more debugging processes may be respectively assigned to individual nodes 304 of decision tree 300 and be executed when individual nodes 304 are traversed. As such, debugging module 20 may execute automated diagnosis by applying decision tree 300 (e.g., traversing decision tree 300) relative to debugging information of an anomalous element (e.g., anomalous leaf network device). Though shown with particular interconnecting lines indicating traversal paths, decision tree 300 may include a variety of traversal paths internal or external to subtrees 302 which debugging module 20 may traverse to perform automated diagnosis of elements 14, 17. Debugging module 20 may traverse paths between nodes 304 in a bidirectional manner in some examples, such as to revisit previously traversed nodes 304 and perform debugging processes of the previously traversed nodes.

Debugging module 20 may use an indication of anomalous elements (e.g., anomalous leaf network devices) as input when applying decision tree 300, such as at a root node 304A of decision tree 300 or subtree 302. When decision tree 300 is applied to an anomalous element, debugging processes executed at traversed nodes 304 of decision tree 300 may output debugging information from which a root cause of a network anomaly may be identified. As described above, a subset of nodes 304 or subtrees 302 may be relevant to diagnosing a particular element 14, 17 (e.g., an element 14, 17 from a particular vendor). Rather than terminating once a first unit of debugging information is generated, debugging module 20 may continue to traverse the relevant subset of nodes 304 or subtrees 302 decision tree 300 and generate and output multiple units of debugging information to allow a user to comprehensively address a network anomaly. Debugging module 20 may store debugging information generated by traversing decision tree 300 to debugging store 41. Debugging module 20 may output the debugging information generated by traversing decision tree 300 to a user, such as through user interface 36 and/or user interface module 38, such as to allow the user to review operating information and/or network device anomalies and to address network anomalies.

In some examples, automated diagnosis may degrade performance of element 14, 17. As such, debugging module 20 may selectively apply automated diagnosis only to elements 14, 17 identified, based on the intent graph data, as anomalous elements (e.g., anomalous leaf network devices).

FIG. 4 is a flowchart illustrating a first example process for network debugging, according to techniques of this disclosure. Controller device 10 may debug various networks, including virtual networks 4 (e.g., EVPN-VXLAN networks) through the process illustrated in the example of FIG. 4. Controller device 10 may store intent graph data associated with a plurality of virtual networks 4 and a plurality of network devices 17. Controller device 10 may configure at least network devices 17 using the intent graph data. For example, controller device 10 may send high-level instructions generated based on an intent to network devices 17. Network devices 17 may translate the high-level instructions into device-level instructions and operate according to the device-level instructions. In some examples, rather than sending high-level instructions, controller device 10 may generate device-level instructions based on the intent. Controller device 10 may send the device-level instructions to network devices 17 such that network device 17 may operate according to the device-level instructions.

To debug virtual network 4, controller device 10 may utilize the intent graph data associated with a plurality of virtual networks 4 and a plurality of network devices 17. The intent graph data may identify, for each network device 17 of the plurality of network devices 17, a subset of the plurality of virtual networks 4 associated with the network device. For example, the intent graph data may include a VNI or other virtual network identifier assigned to each network device 17, that indicates which virtual network(s) 4 network device 17 is configured for (e.g., configured to connect to).

Controller device 10 may determine whether the intent graph data indicates a first network device 17A and a second network device 17B are configured for a common virtual network 4A (402). In some examples, to determine whether the intent graph data indicates first network device 17A and second network device 17B are configured for common virtual network 4A, controller device 10 may determine whether the intent graph data includes a common virtual network identifier (e.g., VNI) for first network device 17A and second network device 17B. In this example, controller device 10 may determine first network device 17A and second network device 17B are configured for common virtual network 4A when the intent graph data includes the same virtual network identifier (e.g., a VNI of 10000) for both first network device 17A and second network device 17B.

In response to determining that the graph indicates first network device 17A and second network device 17B are configured for common virtual network 4A, controller device 10 may determine a network anomaly based on a comparison of first endpoint information obtained from first network device 17A and second endpoint information obtained from second network device 17B (404). To determine the network anomaly, controller device 10 may determine that the first endpoint information does not include a MAC address included in the second endpoint information, or vice versa. For example, controller device 10 may collect the first endpoint information from first network device 17A and the second endpoint information from second network device 17B. To determine the network anomaly, controller device 10 may compare the collected first endpoint information and the collected second endpoint information to determine the first endpoint information does not include a MAC address included in the second endpoint information, or vice versa. Controller device 10 may obtain the endpoint information from network devices 17, for example, at predefined time intervals (e.g., periodically). Controller device 10 may obtain the endpoint information from network devices 17 in response to an event in some examples. For instance, a user may initiate the EVPN debugging process and, in response, controller device 10 may collect the endpoint information from network devices 17.

Controller device 10 may output an indication of the network anomaly (406). In some examples, controller device 10 may output the indication of the network anomaly by outputting an indication of network devices 17 having endpoint information with missing information. For example, controller device 10 may generate data for a user interface 36 that presents the indication of the network anomaly by presenting the data to the user. In some examples, controller device 10 may generate the indication of the network anomaly by applying, based on a decision tree 300, one or more debugging processes to first network device 17A and second network device 17B. As such, the indication of the network anomaly may, in some examples, include debugging information (e.g., one or more misconfigurations, software or hardware bugs, or both) generated by the debugging processes. In some examples, the debugging information may include an indication of a resolution to the network anomaly (e.g., missing configuration setting/flag).

The debugging processes may be a subset of debugging processes of decision tree 300. For example, controller device 10 may apply the debugging processes of a subset of nodes 304 or subtrees 302 in decision tree 300 that are relevant to diagnosing first network device 17A, second network device 17B, or both. For instance, controller device 10 may apply subtree 302B with vendor specific debugging processes to first network device 17A and apply subtree 302C with hardware debugging processes to second network device 17B, or vice versa.

Though described with respect to virtual network 4, controller device 10 may perform the above network debugging process for network devices 17 on various networks, including network 2. For example, controller device 10 may determine network devices 17 are on common network 2 based on intent graph data, such as a common VLAN tag or other common network identification information for a subset of network devices 17 (e.g., four network devices 17 of 100 have a VLAN tag of 7000). Controller device 10 may collect endpoint information from network devices 17 on common network 2. Controller device 10 may compare the collected endpoint information to identify anomalous network devices and network anomalies, such as described above.

Figure 5:
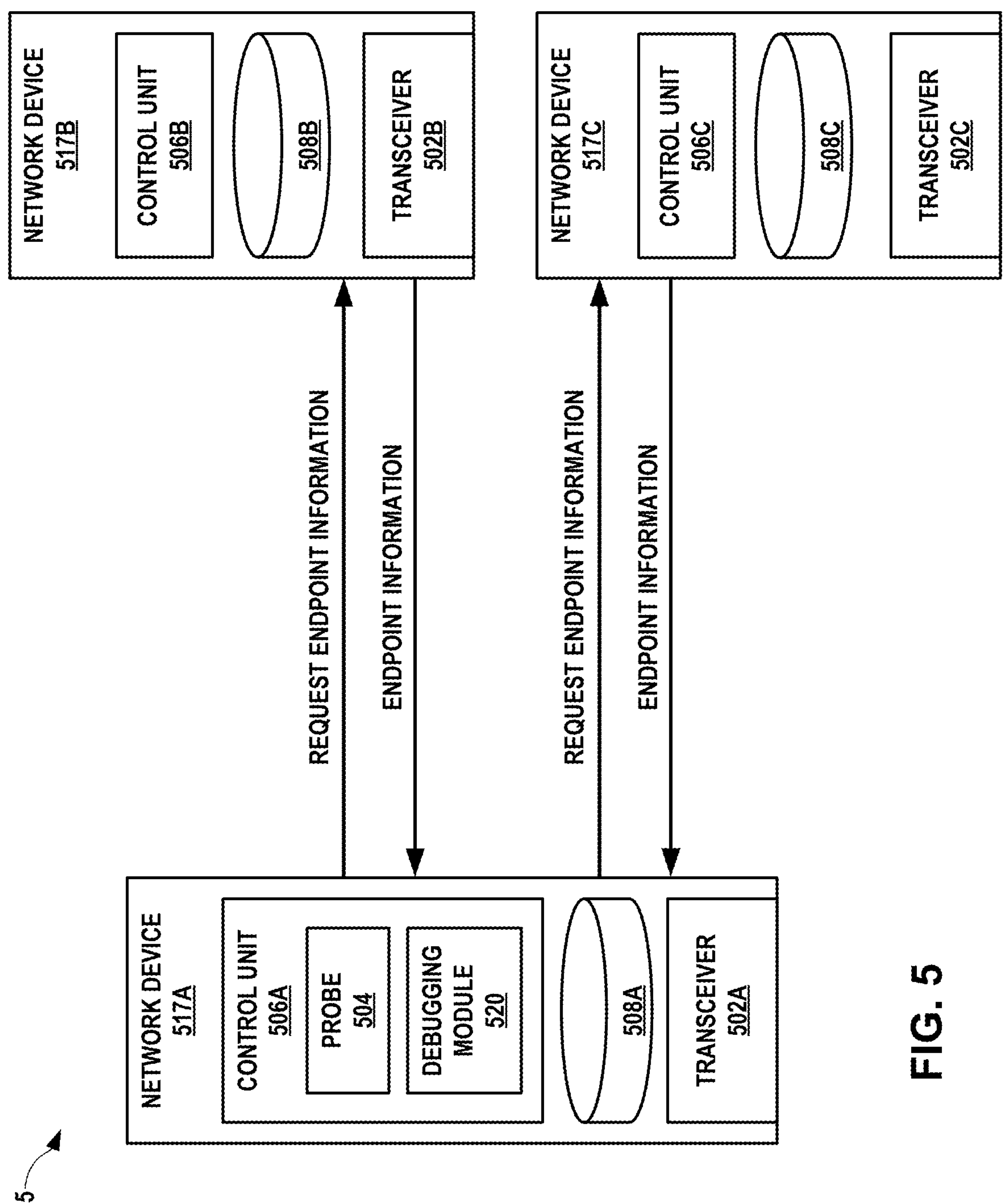
FIG. 5 is a block diagram illustrating elements of an enterprise network that are managed using a network device, according to techniques of this disclosure.

FIG. 5 is a block diagram illustrating elements of an enterprise network that are managed using a network device, according to techniques of this disclosure. Network devices 517A-517C (collectively, network devices 517) may include respective control units 506A-506C (collectively, control units 504) and memories 508A-508C (collectively, memories 508). Control unit 506 represents any combination of hardware, software, and/or firmware for implementing the functionality attributed to control unit 506 and its constituent modules and elements. When control unit 506 includes software or firmware, control unit 506 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

Memory 508 may include a computer-readable media that stores or caches at least the endpoint information for network device 517. For example, memory 508A may store the endpoint information for network device 517A, which network device 517A uses to route network traffic. Memory 508A of network device 517A may store at least a portion of endpoint information of other network devices 517B, 517C, such as for the purpose of performing network debugging (e.g., collection and/or comparison of endpoint information from other network devices 517B, 517C).

In the example of FIG. 5, network devices 517 include respective transceivers 502A-502C (collectively, transceivers 502), such as to implement communication through network 5. Network devices 517 may be examples of network devices 17 of FIG. 1 which may include transceivers 502 such as network interface cards (NICs) (e.g., Ethernet interfaces), optical transceivers, or both. In such case, transceiver 502 may perform network switching, such as to direct network traffic between various source and destination devices. In some examples, transceiver 502 may be an example of network interface 34 of FIG. 2. Network devices 517 may be other devices which may include transceivers 502, such as NICs (e.g., Ethernet interfaces), optical transceivers, and wireless transceivers (e.g., Wireless Fidelity (Wi-Fi) interfaces). Network 5 may be an example of network 2 or virtual network 4 of FIG. 1. As described above, virtual network 4 may be an overlay network supported by an underlying network, such as network 2 of FIG. 1. Fewer or additional network devices 517 may be configured to participate on network 5 than those shown in the example of FIG. 5.

Network device 517A, such as through control unit 506A, may execute probe 504, debugging module 520, or both. In some examples, probe 504 may be an example of data collection module 37 of FIG. 2. For instance, probe 502 may collect at least a portion of the endpoint information of other network devices 517B, 517C, such as by sending requests (e.g., CLI commands or API calls) for endpoint information to other network devices 517B, 517C through transceiver 502A. Probe 502 may receive endpoint information from other network devices 517B, 517C in response to such requests through transceiver 502A. Received endpoint information may be stored on memory 508A. In some examples, memory 508A may be an example of memory 43 and/or debugging store 41 of FIG. 2.

Network devices 517B, 517C may respectively send endpoint information through transceivers 502B, 502C. The endpoint information for network device 517A may already be stored locally at network device 517A, such as in memory 508A, and therefore may not be collected by probe 504. For example, the endpoint information for network device 517A may be a locally stored MAC address table that network device 517A uses to route network traffic. In some examples, rather than sending endpoint information in response to a request for endpoint information, network devices 517 may send endpoint information to a predetermined network device 517A.

Debugging module 520 may be an example of debugging module 20 of FIG. 2. As such, debugging module 520 may compare the endpoint information (e.g., MAC address tables) of each network device 517 within network 5 (e.g., network devices 517A, 517B, 517C) to the endpoint information of other network devices on the common virtual network to identify network anomalies. For example, debugging module 520 may compare endpoint information of network devices 517A, 517B, 517C to identify one or more network devices 517 having endpoint information that is missing information relative to the endpoint information of other network devices 517 on network 5. As described above, the identified network devices 517 may be considered anomalous leaf network devices 517 because these network devices 517 have endpoint information (e.g., MAC address tables) with missing information (e.g., lacking one or more MAC addresses). Debugging module 520 may identify a network anomaly (e.g., forwarding or traffic flow failure) when one or more network devices 517 have endpoint information with missing information (e.g., when one or more anomalous network devices are detected).

In some examples, to determine a network anomaly, network device 517A may compare endpoint information (e.g., MAC address tables) for network devices 517 on network 5 to determine whether the endpoint information of network devices 517 is synchronized. For instance, first network device 517A may compare the MAC address table of a second network device 517B to the MAC address table of a third network device 517C. If each MAC address in a MAC address table of second network device 517B is in a MAC address table of third network device 517C, and vice versa, the endpoint information (e.g., MAC address tables) may be considered synchronized. For example, if the MAC address of second network device 517B (e.g., AA) is in the MAC address table of third network device 517C and the MAC address of third network device 517C (e.g., BB) is in the MAC address table of second network device 517B, network device 517A may consider the endpoint information to be synchronized.

Network device 517A may compare endpoint information of each network device 517, including network device 517A itself, to endpoint information of other network devices 517 in the above manner. If an entry (e.g., MAC address) is missing from endpoint information (e.g., MAC address table) of any network device 517, including network device 517A itself, network device 517A may consider the endpoint information to be unsynchronized. For example, as described above, debugging module 20 may, in some examples, compare each unit of endpoint information to every other unit of endpoint information. Unsynchronized endpoint information (e.g., a MAC address table with missing or lacking particular MAC address(es)) is indicative of a network anomaly and network device 517A may identify a network device 517 and/or its counterpart network devices 517 on network 5 as anomalous network devices (e.g., root or other causes of a network anomaly).

Though shown at network device 517A, various network devices 517 may include probe 504, debugging module 520, or both. For example, more than one network device 517 of network 5 may include probe 504, debugging module 520, or both and thereby identify anomalous network devices 517 in accordance with the described techniques.

Figure 6:
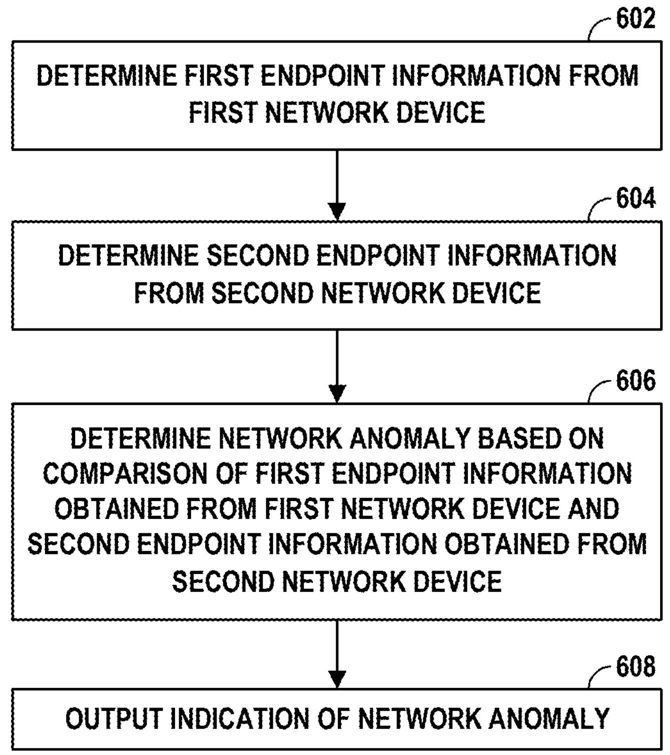
FIG. 6 is a flowchart illustrating a second example process for network debugging, according to techniques of this disclosure.

FIG. 6 is a flowchart illustrating a second example process for network debugging, according to techniques of this disclosure. FIG. 6 illustrates an example process whereby network debugging is performed by a network device (e.g., network device 517A) rather than controller device 10. Network device 517A may determine first endpoint information (e.g., MAC address table) from a first network device (602). For example, the first network device may be network device 517A itself. In such case, network device 517A may determine the first endpoint information by retrieving at least a portion of locally stored endpoint information from memory 508A (e.g., a locally stored MAC address table that network device 517A uses to route network traffic).

In some examples, network device 517A may determine the first endpoint information from another network device (e.g., network device 517B). In such case, network device 517A may determine the first endpoint information by sending a request for the first endpoint information to network device 517B. In response, network device 517B may send a response including the first endpoint information (e.g., a MAC address table stored on memory 508B of network device 517B that network device 517B uses to route network traffic). Network device 517A may receive the response including the first endpoint information from network device 517B. In some examples, network device 517A may store the first endpoint information from network device 517B in memory 508A.

Network device 517A may determine second endpoint information from a second network device (604). For example, network device 517A may send a request for the second endpoint information to network device 517C. Network device 517C may respond by sending the second endpoint information to network device 517A and network device 517A may receive the second endpoint information. Network device 517A may determine a network anomaly based on a comparison of the first endpoint information and the second endpoint information (606). To determine the network anomaly, network device 517A may determine that the first endpoint information does not include a MAC address included in the second endpoint information, or vice versa.

Network device 517A may output an indication of the network anomaly (608). In some examples, network device 517A may output the indication of the network anomaly by outputting an indication of network devices 517 having endpoint information with missing information (e.g., anomalous network devices). In some examples, network device 517A, controller device 10, or both may generate data for a user interface that presents the indication of the network anomaly by presenting the data to the user.

In some examples, responsive to receiving an indication of the network anomaly from network device 517A, controller device 10 may apply, based on a decision tree 300, one or more debugging processes to the first network device and second network device (e.g., respectively, network devices 517A, 517B or, respectively, network devices 517B, 517C). As such, the indication of the network anomaly may, in some examples, include debugging information (e.g., one or more misconfigurations, software or hardware bugs, or both) generated by the debugging processes. The debugging processes may be a subset of debugging processes of decision tree 300. For example, network device 517A may apply the debugging processes of a subset of nodes 304 or subtrees 302 in decision tree 300 that are relevant to diagnosing the first network device, the second network device, or both. For instance, controller device 10 may apply subtree 302B with vendor specific debugging processes to the first network device and apply subtree 302C with hardware debugging processes to the second network device, or vice versa.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method (e.g., when the instructions are executed). Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A system comprising:

machine-readable storage media comprising instructions, wherein the machine-readable storage media is to store intent graph data associated with a plurality of virtual networks and a plurality of network devices, wherein the intent graph data identifies, for each network device of the plurality of network devices, a subset of the plurality of virtual networks associated with the network device; and one or more processors implemented in circuitry, and having access to the machine-readable storage media, wherein the instructions are executable by the one or more processors to:

determine whether the intent graph data indicates a first network device and a second network device are configured for a common virtual network;

based on a determination that the intent graph data indicates the first network device and the second network device are configured for the common virtual network, determine a network anomaly is associated with the first network device based on a determination that first endpoint information obtained from the first network device does not include a media access control (MAC) address included in second endpoint information obtained from the second network device; and based on the determination that the network anomaly is associated with the first network device, perform an automated diagnosis at the first network device to determine a network device anomaly.

2. The system of claim 1, wherein to perform the automated diagnosis at the first network device, the instructions are executable by the one or more processors to apply, based on a decision tree, one or more debugging processes to the first network device and the second network device to determine the network device anomaly.

3. The system of claim 2, wherein the one or more debugging processes are a subset of a plurality of debugging processes and each of the plurality of debugging processes in the plurality of debugging processes is associated with a node of the decision tree.

4. The system of claim 2, wherein the network device anomaly identifies one or more of a misconfiguration, a software bug, or a hardware bug.

5. The system of claim 1, wherein to determine whether the intent graph data indicates the first network device and the second network device are configured for the common virtual network, the instructions are executable by the one or more processors to determine whether the intent graph data includes a common virtual network identifier for the first network device and the second network device.

6. The system of claim 1, wherein the instructions are executable by the one or more processors to periodically obtain endpoint information from the plurality of network devices.

7. The system of claim 1, wherein to perform the automated diagnosis at the first network device, the instructions are executable by the one or more processors to execute one or more commands at the first network device.

8. A method comprising:

determining, by one or more processors implemented in circuitry, whether intent graph data associated with a plurality of virtual networks and a plurality of network devices indicates a first network device and a second network device are configured for a common virtual network, wherein the intent graph data identifies, for each network device of the plurality of network devices, a subset of the plurality of virtual networks associated with the network device;

based on determining that the intent graph data indicates the first network device and the second network device are configured for the common virtual network, determining, by the one or more processors, a network anomaly is associated with the first network device based on determining that first endpoint information obtained from the first network device does not include a media access control (MAC) address included in second endpoint information obtained from the second network device; and based on determining that the network anomaly is associated with the first network device, performing, by the one or more processors, an automated diagnosis at the first network device to determine a network device anomaly.

9. The method of claim 8, wherein performing the automated diagnosis at the first network device comprises applying, based on a decision tree, one or more debugging processes to the first network device and the second network device to determine the network device anomaly.

10. The method of claim 9, wherein the one or more debugging processes are a subset of a plurality of debugging processes and each of the plurality of debugging processes in the plurality of debugging processes is associated with a node of the decision tree.

11. The method of claim 9, wherein the network device anomaly identifies one or more of a misconfiguration, a software bug, or a hardware bug.

12. The method of claim 8, wherein determining whether the intent graph data indicates the first network device and the second network device are configured for the common virtual network comprises determining, by the one or more processors, whether the intent graph data includes a common virtual network identifier for the first network device and the second network device.

13. The method of claim 8, further comprising:

periodically obtaining, by the one or more processors, endpoint information from the plurality of network devices.

14. The method of claim 8, wherein performing the automated diagnosis at the first network device comprises executing one or more commands at the first network device.

15. Non-transitory computer-readable storage media storing instructions, wherein the instructions are to configure one or more processors to:

determine whether intent graph data associated with a plurality of virtual networks and a plurality of network devices indicates a first network device and a second network device are configured for a common virtual network, wherein the intent graph data identifies, for each network device of the plurality of network devices, a subset of the plurality of virtual networks associated with the network device;

based on a determination that the intent graph data indicates the first network device and the second network device are configured for the common virtual network, determine a network anomaly is associated with the first network device based on a determination that first endpoint information obtained from the first network device does not include a media access control (MAC) address included in second endpoint information obtained from the second network device; and based on the determination that the network anomaly is associated with the first network device, perform an automated diagnosis at the first network device to determine a network device anomaly.

16. The non-transitory computer-readable storage media of claim 15, wherein the instructions are to configure the one or more processors to apply, based on a decision tree, one or more debugging processes to the first network device and the second network device to determine the network device anomaly.

17. The non-transitory computer-readable storage media of claim 16, wherein the one or more debugging processes are a subset of a plurality of debugging processes and each of the plurality of debugging processes in the plurality of debugging processes is associated with a node of the decision tree.

18. The non-transitory computer-readable storage media of claim 16, wherein the network device anomaly identifies one or more of a misconfiguration, a software bug, or a hardware bug.

19. The non-transitory computer-readable storage media of claim 15, wherein to determine whether the intent graph data indicates the first network device and the second network device are configured for the common virtual network, the instructions are to configure the one or more processors to determine whether the intent graph data includes a common virtual network identifier for the first network device and the second network device.

* * * * *